(12) United States Patent
Knobloch

(10) Patent No.: US 12,081,031 B2
(45) Date of Patent: Sep. 3, 2024

(54) METHOD FOR STABILIZING THE DC VOLTAGE IN A DC GRID, AND DC-TO-DC CONVERTER FOR CONNECTING A PV GENERATOR TO A DC GRID

(71) Applicant: SMA Solar Technology AG, Niestetal (DE)

(72) Inventor: Andreas Knobloch, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 17/993,007

(22) Filed: Nov. 23, 2022

(65) Prior Publication Data

US 2023/0084081 A1 Mar. 16, 2023

Related U.S. Application Data

(63) Continuation of application No. PCT/EP2021/063640, filed on May 21, 2021.

(30) Foreign Application Priority Data

May 23, 2020 (DE) ..................... 10 2020 113 871.7

(51) Int. Cl.
| | |
|---|---|
| *H02J 3/38* | (2006.01) |
| *H02J 1/10* | (2006.01) |
| *H02J 1/14* | (2006.01) |
| *H02J 3/32* | (2006.01) |
| *H02J 7/35* | (2006.01) |

(52) U.S. Cl.
CPC .............. *H02J 3/381* (2013.01); *H02J 1/102* (2013.01); *H02J 1/14* (2013.01); *H02J 3/32* (2013.01); *H02J 7/35* (2013.01); *H02J 2300/26* (2020.01); *H02J 2300/28* (2020.01)

(58) Field of Classification Search
CPC . Y02E 10/56; Y02E 70/30; G05F 1/67; H02J 3/381; H02J 3/388; H02J 1/10; H02J 1/102; H02J 1/12; H02J 1/14; H02J 2300/24; H02J 2300/26; H02J 3/32
See application file for complete search history.

(56) References Cited

U.S. PATENT DOCUMENTS

| | | | |
|---|---|---|---|
| 10,739,806 B2 | 8/2020 | Laschinski et al. | |
| 11,409,316 B2 | 8/2022 | Knobloch | |
| 2015/0236589 A1 | 8/2015 | Baba | |
| 2019/0181646 A1* | 6/2019 | Fathy | H02S 40/32 |
| 2019/0372380 A1 | 12/2019 | Shen et al. | |

FOREIGN PATENT DOCUMENTS

| | | |
|---|---|---|
| DE | 102011054971 A1 | 5/2013 |
| DE | 102014108601 A1 | 12/2014 |
| DE | 102017102771 A1 | 8/2018 |
| DE | 102018105483 A1 | 9/2019 |

OTHER PUBLICATIONS

International Search Report dated Aug. 10, 2021 in connection with PCT/EP2021/063640.

* cited by examiner

*Primary Examiner* — Ryan Johnson
(74) *Attorney, Agent, or Firm* — Eschweiler & Potashnik, LLC

(57) ABSTRACT

A method is disclosed for stabilizing a DC voltage in a DC grid that includes a DC bus connected to a higher-order grid and to which an energy generating system and at least one load are connected.

15 Claims, 9 Drawing Sheets

METHOD FOR STABILIZING THE DC VOLTAGE IN A DC GRID, AND DC-TO-DC CONVERTER FOR CONNECTING A PV GENERATOR TO A DC GRID

CROSS REFERENCE TO RELATED APPLICATIONS

This application is a continuation of International Patent Application Number PCT/EP2021/063640, filed on May 21, 2021, which claims priority to German Patent Application number 10 2020 113 871.7, filed on May 23, 2020, and is hereby incorporated by reference in its entirety.

FIELD

The disclosure relates to stabilization of a direct current grid (DC grid) for supplying electrical consumers (loads). Direct current consumers (DC loads) can be connected to such a DC grid via direct current converters (DC-to-DC converters), and/or alternating current consumers (AC loads) can be connected to such a DC grid via inverters (DC-to-AC converters).

BACKGROUND

For stable operation of the DC grid, regulation of the electrical parameters of the DC grid is necessary. In particular, stabilization of the DC voltage to a value in a permissible range around a nominal voltage is required in order to reliably operate the consumers on the DC grid. In this case, selected components of the DC grid can contribute autonomously to the stabilization of the DC voltage or can be controlled accordingly by suitable control units.

One criterion for the stability of a DC grid is commonly referred to as the transient DC voltage stability. A transient process such as a sudden switching on or switching off of a large load leads to a sudden power imbalance in the DC grid. This power imbalance may cause a deviation of the DC voltage from the nominal value and must be compensated for as quickly as possible in order to maintain the DC voltage within the permissible range. For this purpose, a so-called instantaneous reserve is necessary, which reacts quickly and reliably to deviations of the DC voltage from the nominal voltage and provides a suitable instantaneous reserve power for compensating for the power imbalance.

In DC grids having a DC grid capacity $C_{DC}$, the DC voltage $U_{DC}$ is a characteristic grid variable. The DC voltage $U_{DC}$ depends upon the active power balance between the inflow IN and outflow OUT at the DC grid capacity $C_{DC}$, specifically according to:

$$\dot{U}_{DC} = \frac{1}{C_{DC}} \frac{(\sum P_{IN} - \sum P_{OUT})}{U_{DC}} = \frac{1}{C_{DC}} (\sum I_{IN} - \sum I_{OUT})$$

$$U_{DC} = \frac{1}{C_{DC}} \int \frac{(\sum P_{IN} - \sum P_{OUT})}{U_{DC}} dt + U_{DC0} = \frac{1}{C_{DC}} \int (\sum I_{IN} - \sum I_{OUT}) dt + U_{DC0}$$

If the DC grid capacity $C_{DC}$ has a cost-effective design such that only a small amount of energy is temporarily stored in the DC bus in total, operating states, in which energy flows into the DC bus without being able to flow out of the DC bus to a sufficient extent, cause a rapid increase in the DC voltage in the DC bus. This can lead to a shutdown of electromechanical devices and thus, e.g., in the industrial environment, to a process stop or, in the worst case, to device destruction.

With regard to stabilization of the DC voltage and equal power distribution in DC grids, concepts are known that are based upon decentralized droop control. In a DC grid, the DC voltage $U_{DC}$ according to $$\dot{U}_{DC} = \frac{1}{C_{DC}} \frac{(P_{IN} - P_{OUT})}{U_{DC}} \rightarrow U_{DC} = \frac{1}{C_{DC}} \int \frac{(P_{IN} - P_{OUT})}{U_{DC}} dt + U_{DC0}$$

is limited in its rate of change $$\dot{U}_{DC} = \frac{dU_{DC}}{dt}$$

by means of an electrical energy store that is represented by the capacity $C_{DC}$, is limited in its deviation from the nominal value $\Delta U_{DC} = U_{DC} - U_{DC0}$ by approximating the power $P_{IN}$ flowing into the DC bus and the power $P_{OUT}$ flowing out of the DC bus according to $P(U_{DC})$ statics, is returned back to its nominal value $U_{DC0}$ by providing the energy $W = \int (P_{IN} - P_{OUT}) dt$ and power $\Delta P = P_{IN} - P_{OUT}$ necessary for this purpose.

DC grids frequently have a DC voltage intermediate circuit (DC bus) to which a plurality of individual electrical components can be connected. The components can be substantially spaced apart and, during operation, exchange electrical powers with the DC bus via corresponding electrical lines. The power exchanged by a component with the DC bus can depend upon the respective operating state of said component or be specified in a targeted manner.

Many components have power converter units via which electrical power flows, for example, from the DC bus into a consumer or a store, or from a store or a power generation unit into the DC bus. A unidirectional or bidirectional connection of sources and sinks to the DC bus is therefore characteristic of such a DC grid, wherein the sources and sinks are connected to the DC bus via power converters. The DC bus has a limited energy storage capacity that can be predefined by a dedicated intermediate circuit capacity and/or capacities in the power converter units themselves. To ensure that the DC grid can be operated in a stable manner at the nominal voltage or in a voltage range around the nominal voltage, suitable control methods and/or regulating methods for stabilizing the DC voltage in the DC bus are therefore necessary.

In such a DC grid, operating states can occur in which energy flows into the DC bus without being able to flow out of the DC bus to a sufficient extent, or vice versa. This may result in impermissible deviations of the DC voltage from the nominal voltage. This occurs in particular during the electrical braking of an electric drive, or even in the case of a strongly different dynamic of power converters that supply energy and discharge energy. If a significant portion of the power flowing out of the DC grid is drawn from a higher-order AC grid, grid faults in the AC grid can also significantly influence the DC voltage. For example, a power converter arranged between the DC grid and AC grid can be operated to provide AC control power to stabilize the AC grid in the case of a grid fault in the AC grid and can thereby be utilized to such an extent that the power converter cannot make any significant contribution to stabilizing the DC voltage.

Accordingly, devices and methods for voltage maintenance are employed in the DC grid in order to maintain the DC voltage in the DC bus in the permissible range around the nominal voltage. The units connected to the DC bus can be involved in this control task to varying degrees, wherein not all units in the system can constructively contribute to the voltage maintenance. In particular, those units that interact with actual industrial processes, e.g., motors or actuators, cannot contribute or can only to a very limited extent contribute to the voltage maintenance because their operation within the industrial process and thus their power consumption are based upon the industrial processes themselves. Rather, such largely independently operating units require a DC voltage that is as constant as possible in the DC bus, which allows interference-free power consumption for the operation of these units, wherein there are, in part, strict requirements arising from the regulation of the process variables regarding the steady-state accuracy, the guidance behavior, and/or on the interference behavior.

Energy generating systems having renewable energy sources such as photovoltaics (PV) or wind can be connected to the DC bus and feed electrical power into the DC bus, which is generally aligned with the maximum available power of the respective energy source. As a result, the renewable energy source is maximally utilized; on the other hand, the volatile nature of the available power of the energy source can lead to power fluctuations that can negatively influence power balance and hence the DC voltage in the DC bus.

A chopper resistor or a controllable dump load can be arranged in the DC grid. When a threshold value is exceeded by the DC voltage in the DC bus, the chopper resistor can be connected in parallel to the DC bus via power electronic switches before the DC voltage reaches an impermissible level. As soon as the DC voltage has sufficiently decreased, the chopper resistor is again disconnected from the DC bus. This process is repeated when the DC voltage in the DC bus rises again over the threshold value. However, the use of such a chopper resistor has a number of disadvantages—in particular, additional space is required and strong heating may occur when high excess power is absorbed by the chopper resistor, which is associated with an increased risk of fire in sensitive environments and/or a considerable cooling effort. In addition, a specific design of the required chopper resistors for an extended—in particular, public—DC grid and for high excess power is complex and expensive.

In a DC grid, an overvoltage can occur, for example, in the following cases, wherein the probability of an impermissible overvoltage in the DC bus increases the higher the nominal voltage $U_{DC0}$ in the DC bus is:

Electrical Braking of an Electric Drive

An electric drive connected to the DC bus can, in certain operating states, transform from a motor to a generator, e.g., during the electrical braking of a robot arm, an elevator in buildings, a centrifuge, a pump, a cableway during downhill travel, or an electric vehicle. A portion of the rotational energy of the drive is fed back into the DC circuit and thus leads to an excess of power in the DC bus. During braking of an electric drive with a constant braking torque, the braking duration can be several seconds or even minutes, depending upon the process.

In order to prevent damage to components due to an increase in voltage in the DC bus resulting from the feedback of the braking energy, countermeasures must be taken in order to maintain the DC voltage in the DC bus below a maximum permissible value. For this purpose, various approaches are known from the prior art.

By means of what is known as an AC crowbar, the braking of electric drives can take place by means of AC-side short-circuiting of the generator winding via switchable resistors. This circuit is very robust and is often used for the emergency stop function of an industrial plant. However, it is disadvantageous that an additional resistor and suitable control and cooling thereof must be provided, the latter in particular being the case when high excess power has to be absorbed over a longer period of time. Furthermore, a crowbar is used in said emergency situations exclusively and hence unused during most of the operating time.

Further known solutions comprise discharging the excess energy from the DC bus or from the drive via a bypass past the DC bus into a (different) electrical grid or into an energy store. This works to the extent that the current-discharging power converters can actually convert the corresponding excess power and feed it into a corresponding sink and are not already loaded themselves.

Discharging the excess power for further use in a store and/or an AC grid is not possible if no energy store is available or if only unidirectional AC/DC rectifiers are arranged between the DC bus and a higher-order AC grid, respectively. Alternatively or additionally, controllable resistors (what are referred to as chopper resistors or dump loads) can therefore be connected to the DC bus or can be connected to the DC grid. As a rule, these resistors are activated and consume excess power if the DC voltage exceeds a defined threshold value. Such chopper resistors can also be used if feedback into another electrical grid would endanger the stability thereof, such that sufficient feedback into said other grid is not possible.

Providing Reserve Power and Grid Support for the Public AC Grid by Means of DC-to-AC Power Converters Between DC Grid and AC Grid A power converter that is arranged between a DC grid and a higher-order grid and supplies the DC grid with considerable electrical power from the higher-order grid can be obliged to contribute to the stabilization of the higher-order grid. Particularly if the higher-order grid is an AC grid having low flywheel inertia and/or if high electrical powers in the megawatt range are regularly exchanged between the DC grid and the higher-order grid, it may be necessary for the DC grid to constitute a virtual flywheel inertia and to provide a directly available, instantaneous reserve power for the higher-order grid by means of the DC-to-AC power converter. The active power of the DC-to-AC power converter can be varied as a function of the deviation of the grid frequency in the AC grid from a nominal frequency and, alternatively or additionally, proportionally to the frequency gradient of the grid frequency. For example, power converters connected to the European grid or a high-voltage direct-current transmission grid (HVDC grid) can be required to provide their full positive or negative nominal power for at least 500 milliseconds as instantaneous reserve power. For this purpose, a correspondingly large energy store is required, which can be arranged either in or on the DC-to-AC power converter or otherwise in the DC grid, and can be controlled accordingly.

Actual provision of the instantaneous reserve power for the AC grid by means of a power converter that is operated per se for supplying a DC grid from a higher-order grid can cause a sudden, significant power imbalance in the DC grid. In particular, overvoltages in the DC bus can occur if a DC-to-AC power converter suddenly has to increase a power fed into the DC grid due to an overfrequency in the higher-order AC grid, or suddenly has to reduce power drawn from the DC grid and thus brings about an excess of power in the DC grid. The overvoltage in the DC grid potentially resulting therefrom can in turn be counteracted by consuming the excess power in a chopper resistor—in particular, if the energy cannot be otherwise used or stored.

A similar situation arises in the case of a grid fault in the higher-order grid, wherein a distinction must be made between a line voltage dip and a line voltage rise. Temporary line voltage dips as a result of short circuits in the higher-order grid are passed through by the grid-side power converter according to standard requirements until a fault is declared, in that, proportional to the voltage dip depth, a reactive current is fed in for a defined time in a prioritized manner (referred to as fault ride through, FRT). In this case, the power converter cannot (any longer) participate in the stabilization of the DC grid because the provision of the FRT reactive current is prioritized over the replacement of the necessary active power. As a result, the active power exchange between the DC grid and AC grid can be completely interrupted for the entire FRT fault duration in an extreme case. Such a behavior of a power converter arranged between the DC grid and higher-order grid jeopardizes the voltage stability of the DC grid if the conflict of objectives occurring here is resolved in favor of the stabilization of the higher-order grid. In addition, it is foreseeable that grid protection mechanisms in AC grids having a low flywheel inertia, i.e., in grids having a decreasing proportion of synchronous machines, require an increasingly long time until triggering and fault removal, and, as a result, increasing fault durations are to be expected. This leads to the fact that DC-to-AC power converters do not contribute to the stabilization of the DC voltage in the DC bus for a relatively long time, such that alternative control mechanisms are required for stabilizing the DC bus voltage.

Furthermore, a briefly increased power fed back from the higher-order grid into the DC bus and thus a rapid voltage rise in the DC bus can occur if the AC grid voltage returns after a short-circuit fault is cleared in the higher-order grid and/or if a temporary overvoltage is present in the higher-order grid. In addition, in the case of asymmetrical grid faults in the higher-order grid, an asymmetrical power exchange between the DC grid and the higher-order grid can occur. As a result, vibrations can arise in the DC voltage, which can likewise lead to overvoltages.

If such power imbalances in the DC grid cannot be compensated for quickly enough by components that are present anyway in the DC grid, such as controllable electric drives, chopper resistors or an electronic load can be used, according to the prior art.

AC-Side Limitation or Nominal Power Operation of the Grid-Side Power Converter in the Case of Full Grid Feed-In from the DC Subgrid into a Public Energy Grid From an economic point of view, it can be desirable to supply all consumers in the DC grid with energy from renewable sources that are connected to the DC grid itself, and to feed excess energy into a higher-order grid. In this case, situations can occur in which the power converters, which discharge power from the DC grid to the higher-order grid, already operate close to their permissible maximum power. Alternatively or additionally, the power fed into the higher-order grid can be limited at least temporarily—for example, due to an excess of power in the higher-order grid. As a result, there is hardly any margin for participating in the stabilization of the DC voltage—for example, transferring additional excess power from the DC grid to the higher-order grid.

In the event of a sudden excess of power in the DC bus, the excess power could thus either be consumed anywhere for DC voltage stabilization, which, for process engineering reasons, is not always possible, or be burned in a chopper resistor—in particular, if other components in the DC subgrid cannot change their power or cannot change it sufficiently quickly enough. Furthermore, the following measures for protection against overvoltages in a DC grid are known from the prior art:

A larger design of the DC intermediate circuit capacity, individually or in the DC grid overall in each power converter coupled on the DC side, is complex and expensive—in particular, due to the hardware required.

Faster control of the power converters between DC grid and a higher-order grid is not always possible with conventional power converters and requires more expensive components.

It is known from EP 1 929 604 A1 to short circuit bridge switches of a power converter. This can lead to increased heating of the switches in the case of a long-lasting overvoltage and can be used only briefly in this respect.

SUMMARY

The disclosure is directed to an inexpensive and robust solution for voltage stabilization and for protection against transient overvoltages in DC grids.

In a method for stabilizing a DC voltage in a DC grid, the DC grid comprises a DC bus that has the DC voltage. An energy generating system and at least one load are connected to the DC bus, and the DC bus is connected to a higher-order grid. An electrical grid power is exchanged between the DC bus and the higher-order grid, and the electrical grid power is varied in order to maintain a DC voltage in the DC bus at a nominal voltage. The energy generating system comprises a PV generator that is connected to the DC bus via a DC-to-DC converter and exchanges electrical generator power with the DC bus. In a normal operating mode, the electrical generator power is set to a normal operating power by the DC-to-DC converter as a function of an MPP power of the PV generator, wherein the normal operating power is set variably in a predetermined relation to the MPP power of the PV generator or fixedly, at a value below the MPP power of the PV generator. The DC voltage in the DC bus is monitored by the energy generating system. In a grid support mode, the electrical generator power is set as a function of the DC voltage in the DC bus to a grid support power in order to counteract a power imbalance between the total electrical power supplied to the DC bus and the total power withdrawn from the DC bus, wherein the grid support power is set as a function of a deviation of the DC voltage from its nominal value and/or a rate of change of the DC voltage.

In one embodiment, such a DC grid comprises non-PV power converters—for example, those that exchange electrical grid power between the DC bus and the energy supply grid and assume the steady-state control of the DC bus voltage during normal operation. The aim is to maintain the DC bus voltage in a permissible voltage band around the nominal voltage $U_{\_NOM}$ by suitably varying the electrical grid power. However, the control dynamics of these non-PV power converters are comparatively slow and characterized by a temporary or permanently limited power consumption capacity. Therefore, non-PV power converters in a grid support operation that can occur in DC grids, for example, due to the effects described at the outset, can maintain the DC bus voltage within the permissible voltage band around the nominal voltage to a limited extent only. By setting the generator power to a grid support power according to the method, the energy generating system in the grid support operation can provide a decisive contribution to stabilizing the DC voltage in the DC bus. The DC-to-DC converter of the energy generating system is characterized by comparatively high control dynamics, such that transient overvoltages are also counteracted by the contribution of the energy generating system. For example, the avoidance of overvoltages due to the effects described at the outset is significantly improved.

In one embodiment, the generator power can be set according to the grid support mode when the DC voltage in the DC bus exceeds a predetermined limit value. As a result, the energy generating system counteracts overvoltages in the DC bus in a targeted manner. In one embodiment, the generator power can be set by clocking power semiconductors of the DC-to-DC converter. In the normal operating mode, however, a PV voltage applied to the PV generator is set to a normal operating voltage by means of a first clock rate—for example, to the MPP voltage or a voltage deviating from the MPP voltage. In the grid support mode, the electrical generator power is reduced by comparison, in that the DC-to-DC converter is operated by means of a second clock rate such that the PV voltage changes in the direction of the DC voltage.

In one embodiment of the method, the grid support mode is entered, and the DC-to-DC converter is operated at the second clock rate, when the DC voltage in the DC bus exceeds a limit value or a value deviating upwards from the limit value by a hysteresis. When the DC voltage falls below the limit value or a value deviating downwards from the limit value by a hysteresis amount, the normal operating mode is again entered, and the DC-to-DC converter is operated in a clocked manner at the first clock rate. By setting the grid support power on the basis of a change in the clock rate of the DC-to-DC converter that drives the generator voltage in the direction of the DC voltage in the DC bus, a particularly effective reaction to an overvoltage in the DC bus is possible. In one embodiment, the DC-to-DC converter is not clocked at all in grid support mode in that the second clock rate has the value zero or one depending upon the specific topology, such that the greatest possible voltage gradient between the DC voltage in the DC bus and the PV voltage is used, taking into account any capacitances and inductances of the DC-to-DC converter.

When a second clock rate of zero or one is used, the PV voltage can be adjusted to the DC voltage in the DC bus. In one embodiment of the method, the DC-to-DC converter can also be operated in the grid support mode in such a way that the PV voltage is increased further with respect to the DC voltage when the PV voltage is matched to the DC voltage, and the DC voltage in the DC bus continues to exceed the limit value. As a result, the difference between the normal operating power and the grid support power, i.e., the control power of the energy generating system, can be further increased such that even higher power imbalances can be compensated for in the DC grid. In this case, the sign of the generator power can change such that a supply of generator power from the PV generator to the DC bus in normal operation is replaced by a feedback of electrical generator power from the DC bus to the PV generator.

In one embodiment, the change in the electrical generator power is carried out by increasing the PV voltage (commonly referred to as right derating, i.e., regulation in the direction of the open-circuit voltage of the PV generator). A corresponding change by lowering the PV voltage in the direction of the short circuit is also possible in principle, wherein a feedback in this case can be brought about by reversing the polarity of the voltage at the PV generator.

In one embodiment, the grid support power is less than the normal operating power by a currently provided PV control power. The grid support power can have a reversed sign with respect to the normal operating power when the deviation of the DC voltage in the DC bus from its nominal value and/or when the rate of change of the DC voltage in the DC bus requires a PV control power amount that is greater than the current MPP power, and thus also greater than the normal operating power of the PV generator. In other words, the energy generating system is capable of providing a PV control power for stabilizing the DC voltage in the DC bus, which PV control power significantly exceeds the MPP power of the PV generator. The PV control power can thus be at least the sum of the current MPP power and the nominal power of the PV generator.

In one embodiment of the method, the rate of change of the DC voltage is determined from a derivative of a voltage measurement or from a current measurement. For example, the determination of the rate of change of the DC voltage from a current measurement places considerably lower demands upon the necessary measurement technology and is, moreover, faster and more accurate, because the formation of a derivative can be dispensed with.

An energy store that exchanges a storage power with the DC bus can be connected to the DC bus. In normal operating mode, the storage power can be equal to zero or can comprise a charging of the store. In grid support mode, the storage power can comprise discharging the store in order to counteract a reduction in the DC voltage in the DC bus with respect to the nominal value thereof. In this respect, the energy store contributes to the stabilization of the DC voltage in the DC bus by counteracting an undervoltage, while the energy generating system is configured to counteract an overvoltage.

In one embodiment, in the grid support operation, the storage power can, optionally, be increased in order to counteract a power deficit in the DC bus, and the PV power can optionally be lowered in order to counteract an excess of power in the DC bus. In one embodiment, in the normal operating mode, a state of charge of the energy store is sought, which state of charge is between 90% and 100% of the charging capacity of the energy store. Therefore, a large part of the capacity of the energy store is available for the provisioning of stabilizing control power in the case of a power deficit. This is possible when the energy store is not responsible for stabilizing the DC voltage in the case of an excess of power in the DC grid, while the energy generating system provides the necessary stabilizing control power.

In a further embodiment, the DC bus is connected to the higher-order grid via a bidirectional power converter. In one embodiment, the bidirectional power converter is configured as a DC-to-DC converter when the higher-order grid comprises a further DC grid. Alternatively, the bidirectional power converter is configured as an inverter when the higher-order grid comprises an AC voltage grid (AC grid). The electrical grid power exchanged via the bidirectional power converter between the DC bus and the higher-order grid can be set for stabilizing the higher-order grid—for example, as a function of electrical properties of the higher-order grid. In certain situations—for example, when the control power has to be provided for stabilizing the higher-order grid—the grid power does not, or at least preferably does not, contribute to the stabilization of the DC voltage in the DC bus, but can, on the contrary, act in a destabilizing manner. However, this effect is effectively overcompensated for by the provision of control power by the energy generating system, such that the bidirectional power converter can provide control power for stabilizing the higher-order grid without impairing the stabilization of the DC voltage in the DC bus.

In one embodiment, the DC bus can be connected via the DC-to-DC converter to a DC voltage-based supply network and at the same time via the inverter to an AC voltage-based power supply grid, and exchange both a DC grid power and an AC grid power. This results in a further degree of freedom for the method, which can be used for optimal utilization of the energy generated by the PV generator—for example, when one of the higher-order grids is not available, or is only available to a limited extent, for the exchange of grid power.

In addition, in the normal operating mode, a grid power can flow from the DC bus to the AC grid and/or the further DC grid. In the normal operating mode, the grid power can comprise an excess power that corresponds to a difference between the electrical generator power generated by the energy generating system and the power consumed by the consumer and/or the machine.

In one embodiment, a DC-to-DC converter for connecting a PV generator to a DC bus of a DC grid is configured to exchange electrical power between the PV generator and the DC bus, and comprises a controller that is configured to carry out a method according to the preceding description.

In summary, a method for stabilizing the DC voltage in a DC bus has been disclosed that is suitable, for example, for protection against overvoltages in the DC bus due to transient power imbalances between generation and consumption in a DC grid. The system comprises at least one PV generator coupled to the DC bus via a DC-to-DC converter, wherein the DC-to-DC converter is configured to i. remove power or current from the PV generator and feed it into the DC bus, and optionally remove power or current from the DC bus and feed it into the PV generator;
ii. monitor the DC bus voltage,
iii. alternatively or additionally, monitor the current flow in the DC bus or in a partial capacitance of the DC bus—in particular, by means of a current sensor arranged in series with the DC bus (sub)capacitance,
iv. operate the PV generator in the normal operating mode independently of the DC bus voltage at or near the point of maximum power output (MPP),
v. vary its mode of operation in deviation from the control objectives provided in normal operating mode—for example, independently of the MPP of the PV generator—in order to counteract, in a grid support mode, for example, a change in the DC voltage in the DC bus, and
vi. in the grid support mode, regulate the PV power in a controlled manner, i.e., change the current, power, and operating point on the characteristic curve of the PV generator, and optionally feed power back into the PV generator and there convert it to heat.

In the grid support mode, a PV power is provided that depends upon the amplitude, the deviation from the nominal value, and/or the rate of change of the DC voltage in the DC bus or upon the amplitude of the current in the DC bus or in a partial capacitance of the DC bus.

The method is characterized in that any power imbalances in the DC bus are counteracted by means of the PV generator such that an undesired increase in the DC bus voltage due to the power imbalance can be slowed down or completely prevented by means of the PV generator. In this case, electrical power can be fed back into the PV generator such that the PV generator is effectively involved in the stabilization of the DC bus voltage under any irradiation conditions.

The versatile and technically favorable use of the energy generating system providing reserve power as described with the PV generator, which acts both as a generator and as a flexibly controllable consumer, offers great advantages in supporting the stabilization of the DC voltage in the DC bus of a DC grid. For example, in comparison with conventional means such as chopper resistors or elaborately extended connections to higher-order grids, significantly less effort is involved, because the required components are generally already available and can be used synergistically as soon as an energy generating system is connected to the DC grid and operated according to the disclosure. Particularly advantageous effects result for fast transient processes, which are characterized by a large amount of power, but little energy due to the short duration of such processes, such that dedicated energy stores would be oversized and could not be amortized.

The disadvantage inherent to the conventional chopper resistors that energy is "burned" and ultimately not used expediently also occurs in principle in the solution according to the disclosure. However, this is clearly outweighed by the advantages of using the energy generating system for stabilizing the grid voltage in grid support mode. For example, a chopper resistor is, in normal operating mode, i.e., by far, predominantly, virtually inactive, while the PV generator of the energy generating system, even in the normal operating mode, produces electrical power from a renewable source, which electrical power is expediently used in the DC grid and makes regeneratively generated energy available.

The disclosure represents a more cost-effective solution for improving voltage maintenance and for protection against transient overvoltages in a DC grid. By using the PV system according to one embodiment of the disclosure, chopper resistors, including their peripherals, such as cooling, control, and measurement technology, can be saved upon. In one embodiment, due to its planar construction and its continuous contact with the surrounding air, the PV generator is well cooled and therefore provides a favorable area for dissipating power when converted to heat. Therefore, the PV generator is suitable for discharging significant excess powers such that, ideally, chopper resistors in the DC grid can be dispensed with completely. In addition, further existing system components can be used according to the disclosure—for example, parts of the measuring technology of the PV-DC-to-DC converter already present for normal operation.

Alternatively or additionally, PV generators can be connected very easily to DC grids—optionally, in the form of a retrofit solution. The control strategy of the other DC bus-coupled power converters does not have to be changed, or need be changed only slightly.

In one embodiment, the operation of the PV generator for stabilizing the DC bus voltage can be activated depending upon a threshold value for the DC bus voltage. The PV generator operates at the MPP during normal operation as long as the DC bus voltage deviates by less than the threshold value from a nominal value. The switch-on threshold can be less than, equal to, or greater than further switch-on thresholds of other actuators in the DC grid that are also involved in the stabilization of the DC voltage.

In one embodiment, the contribution of the energy generating system to the stabilization of the DC bus voltage can be quantified differently depending upon the size ratio between the nominal power of the PV generator and the nominal powers of the other participants in the DC grid. For example, in the case of an overvoltage in the DC grid, the PV generator can provide a control power that slows down, stops, or even reverses the voltage rise and returns the DC voltage in the DC bus towards the nominal value. In each of these cases, the PV power can again be returned to the normal operating power, as soon as other actuators on the DC bus respond to the overvoltage and in turn provide control power, in order to return the DC voltage in the DC bus to a permitted range around its nominal value.

Various embodiments of methods for operating the PV power converters participating in the overvoltage protection in the DC grid have thus been shown, wherein the embodiments can in principle be combined with one another.

BRIEF DESCRIPTION OF THE FIGURES

The disclosure is further explained and described below with reference to exemplary embodiments illustrated in the figures.

DETAILED DESCRIPTION

The disclosure relates to stabilization of a direct current grid (DC grid) for supplying electrical consumers (loads). Direct current consumers (DC loads) can be connected to such a DC grid via direct current converters (DC-to-DC converters), and/or alternating current consumers (AC loads) can be connected to such a DC grid via inverters (DC-to-AC converters). In addition, converters for connecting the DC grid to an alternating current grid (AC grid), electrical energy stores, and energy generating systems having energy sources and further DC-to-DC converters can be connected to the DC grid. The energy sources can comprise photovoltaic generators (PV generators) or wind turbines.

Figure 1:
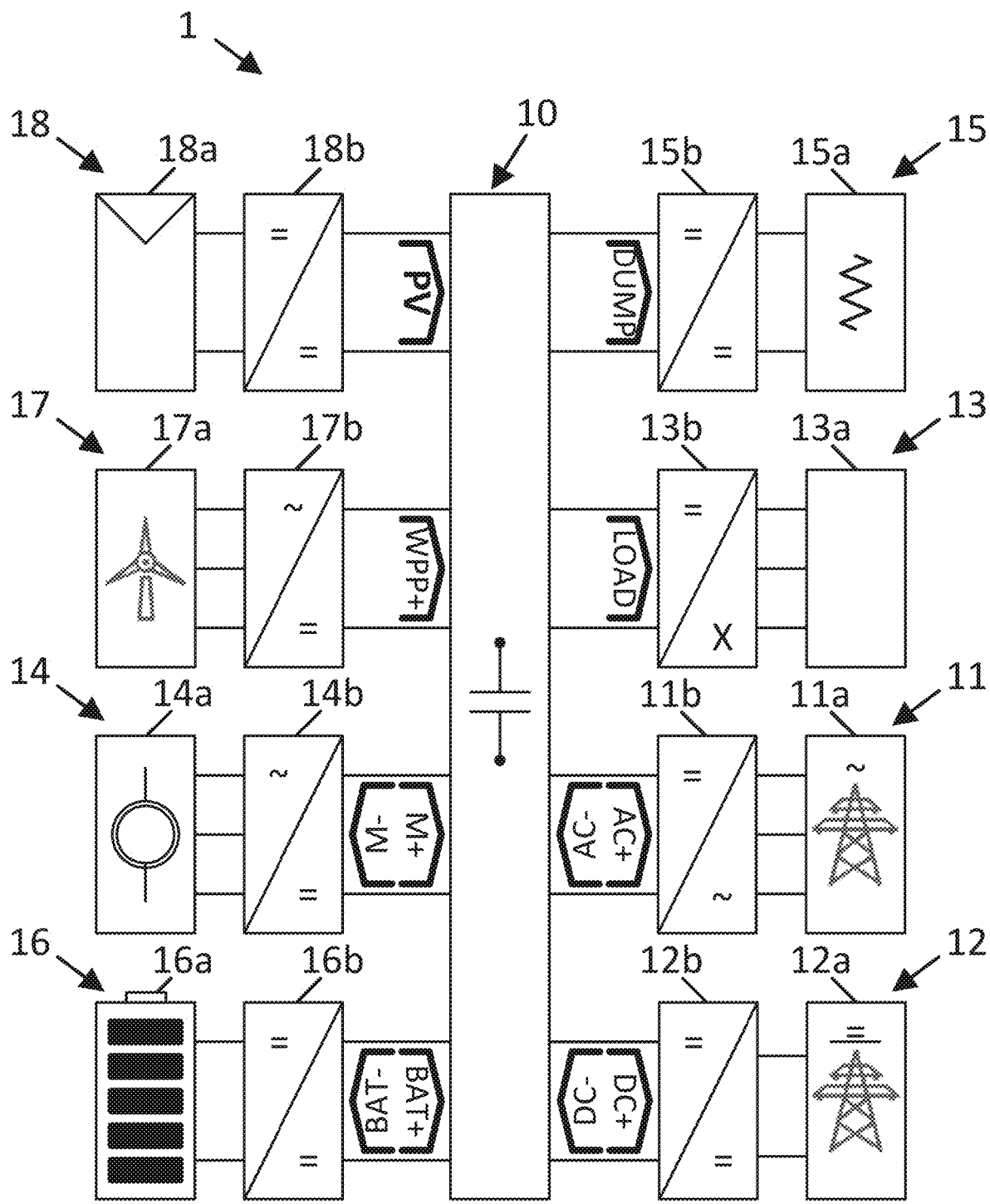
FIG. 1 shows a DC grid in a first embodiment.

FIG. 1 shows a DC grid 1 with a DC bus 10 for energy transmission between different electrical units 11-18. Electrical power flows between these units 11-18 within the DC grid 1 via the DC bus 10. Such a DC grid 1 can, for example, be located in an industrial environment, e.g., a factory or a production plant, and have a considerable spatial extent—for example, comprise dozens or hundreds of square meters. The DC bus 10 is connected to a higher-order AC grid 11 and/or to a further DC grid 12. The AC grid 11 can, for example, comprise a public energy supply grid 11*a*, while the further DC grid 12 comprises, for example, a higher-order or adjacent supply grid 12*a*. Electrical power can be exchanged between the DC bus 10 and the AC grid 11 or the DC grid 12 by arranging a bidirectional inverter (DC-to-AC converter) 11*b* between the DC bus 10 and the energy supply grid 11*a* or a bidirectional DC-to-DC converter 12*b* between the DC bus 10 and the supply grid 12*a*. Via the DC-to-AC converter 11*b*, an electrical AC grid power is taken from the energy supply grid 11*a* and fed into the DC bus 10 or vice versa. Via the DC-to-DC converter 12*b*, an electrical DC grid power is taken from the supply grid 12*a* and fed into the DC bus 10 or vice versa.

A load 13, which comprises a consumer 13*a* and a power supply 13*b*, is connected to the DC bus 10. The power supply 13*b* is configured to extract an electrical consumer power from the DC bus 10 and to make it available to the consumer 13*a* in a suitable form with respect to current and voltage. Depending upon the type of consumer 13*a* (DC or AC), the power supply 13*b* can in particular comprise a DC-to-DC converter and/or an inverter—optionally, an inverter having variable output frequency. The actual consumer power flowing from the DC bus 10 into the load 13 can be set both by the consumer 13*a* and the power supply 13*b*—for example, also as a function of a higher-order control unit—for example, a process controller (not shown).

In one embodiment, when the consumer 13*a* is part of a larger system, e.g., a motor or a cooling system in an industrial or commercial plant, the consumer power can be predefined by a higher-order control unit in such a way that safe and continuous operation of the system is sought. In this respect, the consumer power is generally assumed, in the context of the operation of the DC grid 10, as being given and can be modified only in exceptional cases for other reasons, in order to contribute, for example, to the stabilization of the DC grid. However, the load 13 can, due to its operation, have considerable feedback effects on the DC bus 10—particularly if the consumer 13*a* performs switching operations and/or has a rotating flywheel mass, and thus an electromechanical inertia that generates considerable currents by accelerating and decelerating the flywheel mass.

Alternatively or additionally, the load 13 can have a consumer 13*a*, the consumer power of which can be modified within certain limits without affecting the operation of the consumer 13*a* in principle. For example, the load 13 can comprise an electrolyzer that has a nominal power and can be operated in an operating range around, as well as below, the nominal power. Such an electrolyzer can be connected to the DC bus 10 via a power supply 13*b*, wherein the power supply 13*b* can change the consumer power of the electrolyzer due to an external control signal or also autonomously as a function of electrical measurement values.

In addition, in one embodiment a machine 14 can be connected to the DC bus, which machine has a generator 14*a* and a bidirectional DC-to-AC converter 14*b*. The machine 14 can exchange an electrical machine power with the DC bus 10, wherein the generator 14*a* is driven externally, depending upon the operating mode, e.g., by an internal combustion engine, such that the DC-to-AC converter 14*b* feeds electrical power into the DC bus, and/or itself develops driving force in that the DC-to-AC converter 14*b* draws electrical power from the DC bus 10 and feeds it into the generator 14*a*. The machine power actually exchanged with the machine 14 can in this embodiment be predefined via a control signal and/or can be set autonomously by the machine 14.

The DC grid 10 can have a reserve load 15 that is intended, in one embodiment, to contribute to the stabilization of the DC grid. The reserve load can have a load resistor 15a—for example, what is known as a chopper resistor—into which an electrical reserve power is fed by means of a DC-to-DC converter 15b. The reserve load 15 can, for example, absorb excess power from the DC bus 10, which excess power is then converted only to heat in the load resistor 15a and is therefore not available or is available only to a very limited extent for further use. The actual reserve power can thereby be predefined via a control signal and/or can be set autonomously by the reserve load 15—for example, as a function of electrical parameters of the DC bus 10—for example, the DC voltage U_DC in the DC bus 10.

Furthermore, an electrical energy store 16 can be connected to the DC bus 10. The energy store 16 can, for example, have a battery 16a that is connected to the DC bus 10 via a DC-to-DC converter 16b. An electrical storage power can be fed into the battery 16a or taken from the battery 16a via the DC-to-DC converter 16b. The actual storage power can thereby be predefined via a control signal and/or be set autonomously by the energy store 16.

In one embodiment, the DC grid can further comprise energy generating systems—for example, a wind energy installation (WEI) 17 and/or a photovoltaic system (PV system) 18. The WEI 17 can comprise a wind turbine 17a that generates an electric wind energy power and feeds it into the DC bus 10 via an AC-to-DC converter 17b. The PV system 18 can comprise a PV generator 18a that can generate an electrical PV power that is fed into the DC bus 10 via a DC-to-DC converter 18b. The actual wind energy power and the actual PV power are, in one embodiment, based upon the maximum possible power of the wind turbine 17a or of the PV generator 18a in order to exploit the energy originating from these regenerative sources as completely as possible. In a normal operation, the PV generator 18a can feed the maximum possible PV power into the DC grid via the controllable DC-to-DC converter 18b largely independently of the DC voltage in the DC bus 10. Depending upon the voltage ratio between the DC voltage U_DC in the DC bus 10 and the PV voltage, a correspondingly suitable DC-to-DC converter 18b can be used—for example, a step-up converter, a step-down converter, or a two-quadrant converter. In this case, the DC-to-DC converter 18b generally comprises an arrangement of power semiconductors, i.e., in particular, diodes and switches, as well as capacitors and/or inductors, wherein the power semiconductors can be operated in a clocked manner in order to generate a desired transmission ratio between the DC voltage in the DC bus 10 and the PV voltage U_PV at the PV generator 18a.

In one embodiment, a DC grid 1 according to FIG. 1 can be operated in such a way that the renewable energy from the WEI 17 and PV system 18 is used to cover the power requirement of the loads 13 and, optionally, the machines 14. Electrical power required beyond this can, optionally, be temporarily drawn from the energy store 16 and/or, in the long term, from the AC grid 11 and/or the DC grid 12. Conversely, in the event of an excess of power in the DC grid 1, electrical power can, optionally, be temporarily introduced into the reserve load 15 and/or into the energy store 16, or fed into the AC grid 11 and/or into the DC grid 12 in the long term. The economically optimal operation of such a DC grid 1 is generally obtained if the energy requirement within the DC grid 1 is completely covered by renewable energy sources, i.e., by the WEI 17 and/or the PV system 18, wherein the energy store 16 can optionally compensate for interim shortfalls. As a result, as far as possible, no current is drawn from the AC grid 11 or the DC grid 12, and instead as much as possible of the excess current generated in the DC grid 1 is fed into the AC grid 11 and/or the DC grid 12.

Figure 2:
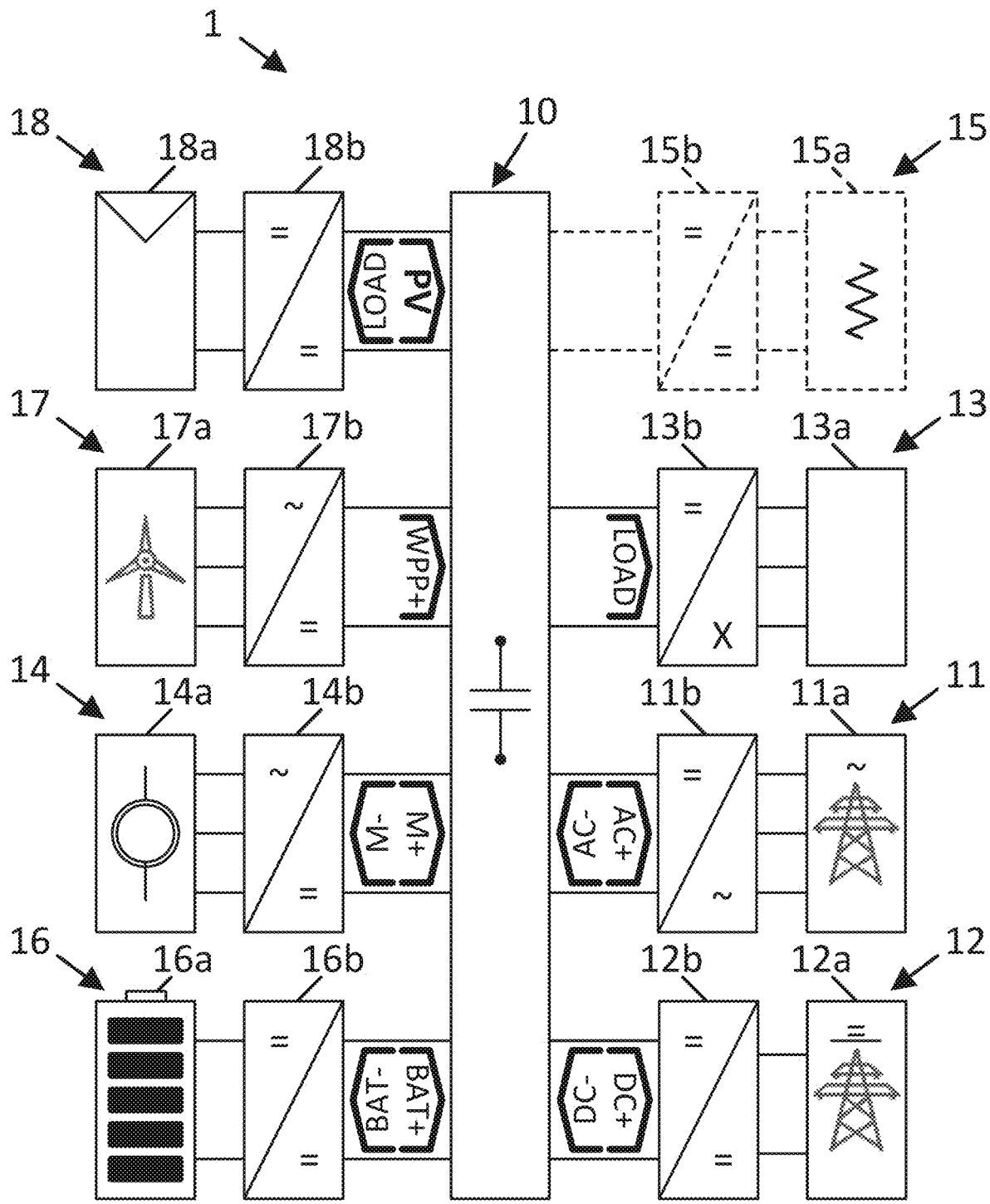
FIG. 2 shows a DC grid in a second embodiment.

FIG. 2 shows a DC grid 1 that is largely identical to the DC grid 1 according to FIG. 1. In contrast to FIG. 1, the reserve load 15 in the DC grid 1 according to FIG. 2 is merely optional, i.e., it can be omitted. Any excess power in the DC bus 10 that was generated, for example, by the energy generating systems 17, 18, but does not flow off to the load 13 or the machine 14, can be fed into the AC grid 11 and/or the further DC grid 12, and can optionally be used to charge the energy store 16.

In one embodiment, the energy store 16 can be almost fully charged in a normal operating mode, i.e., have a state of charge between 90% and 100% of the charging capacity. In the case of a power deficit in the DC bus 10, storage power can be fed from the energy store 16 into the DC bus 10 in order to counteract an undervoltage in the DC bus 10. In the event of an excess of power, the PV power can be reduced—optionally, also to a negative value—by virtue of electrical power being fed back into the PV generator 18a. By means of this operational distribution between the energy store 16 and the PV system 18, the energy store 16 can, for example, be optimally designed and used, and the PV system 18 develops a surplus value that significantly exceeds the mere generation of electrical power.

Specific embodiments of the method according to the disclosure for operating the DC grid 1 are explained with reference to the following FIGS. 3-8.

Figure 3:
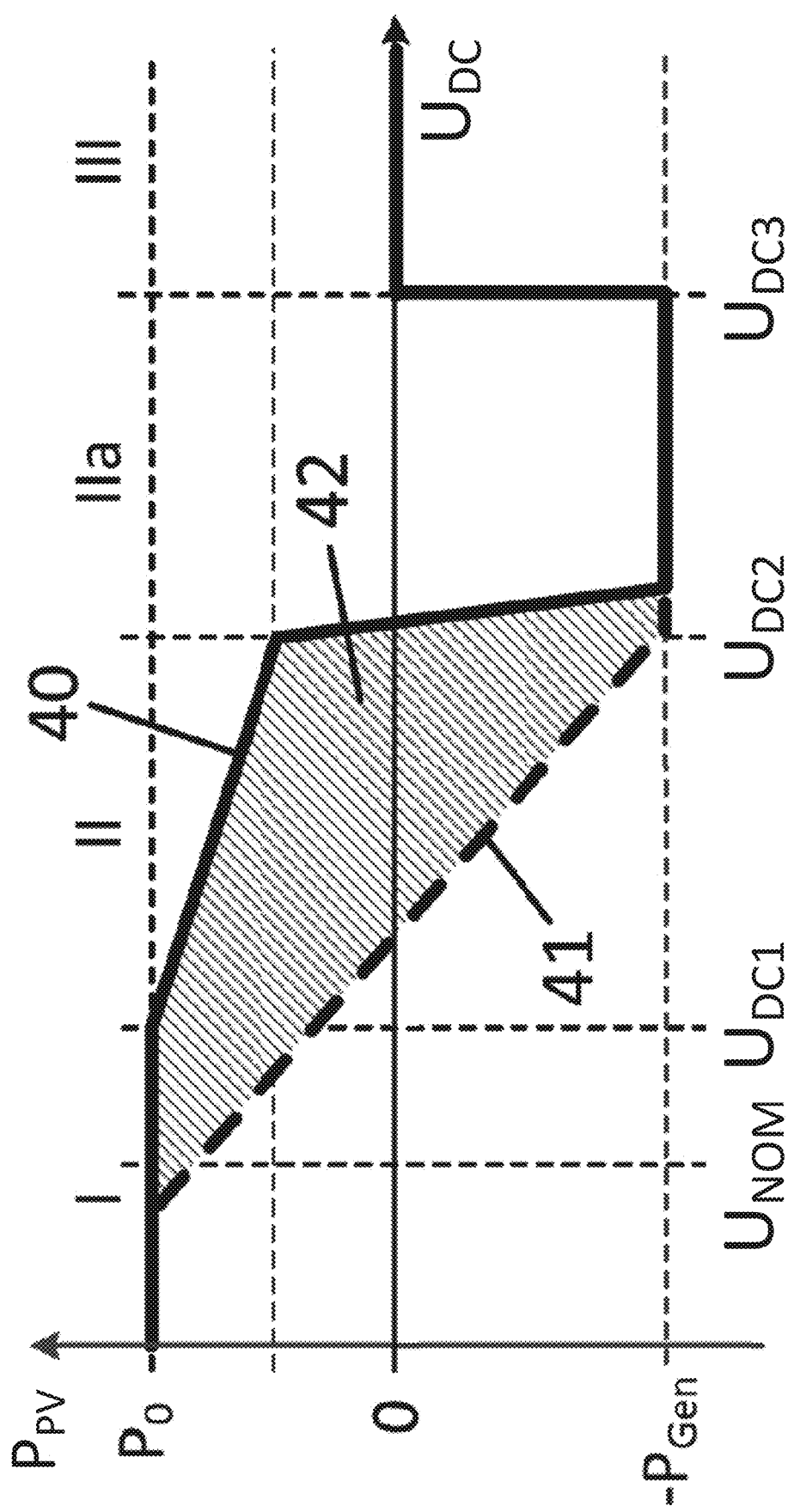
FIG. 3 shows a characteristic curve from one embodiment of a method for stabilizing a DC voltage in a DC grid.

FIG. 3 shows an embodiment of the method according to the disclosure in which the PV power $P_{PV}$ is changed along a $P_{PV}(U_{DC})$ characteristic curve as a function of the DC voltage $U_{DC}$ in the DC bus 10. The specific dependence of the PV power $P_{PV}$ upon the DC voltage $U_{DC}$ in the DC bus 10 can be predefined by a characteristic curve that, according to FIG. 3, runs in a characteristic curve range 42 that is defined by the upper characteristic curve limit 40 and the lower characteristic curve limit 41.

In a first region I, where $U_{DC}<U_{DC1}$, the DC voltage $U_{DC}$ in the DC bus 10 is in the region of the nominal voltage $U_{Nom}$. In this region I, the PV system 18 operates in the normal operating mode and feeds the normal operating power $P_0$ into the DC bus 10. The normal operating power $P_0$ can correspond to the maximum possible MPP power of the PV generator 18a or be based upon the MPP power, i.e., for example, comprise 90% of the MPP power, and in this respect can be varied at a fluctuating MPP power; alternatively, the normal operating power $P_0$ can have a fixed value, which value is less than the MPP power. In the region I, there is thus no or only a small degree of regulation of the PV power compared to the MPP power.

Figure 4:
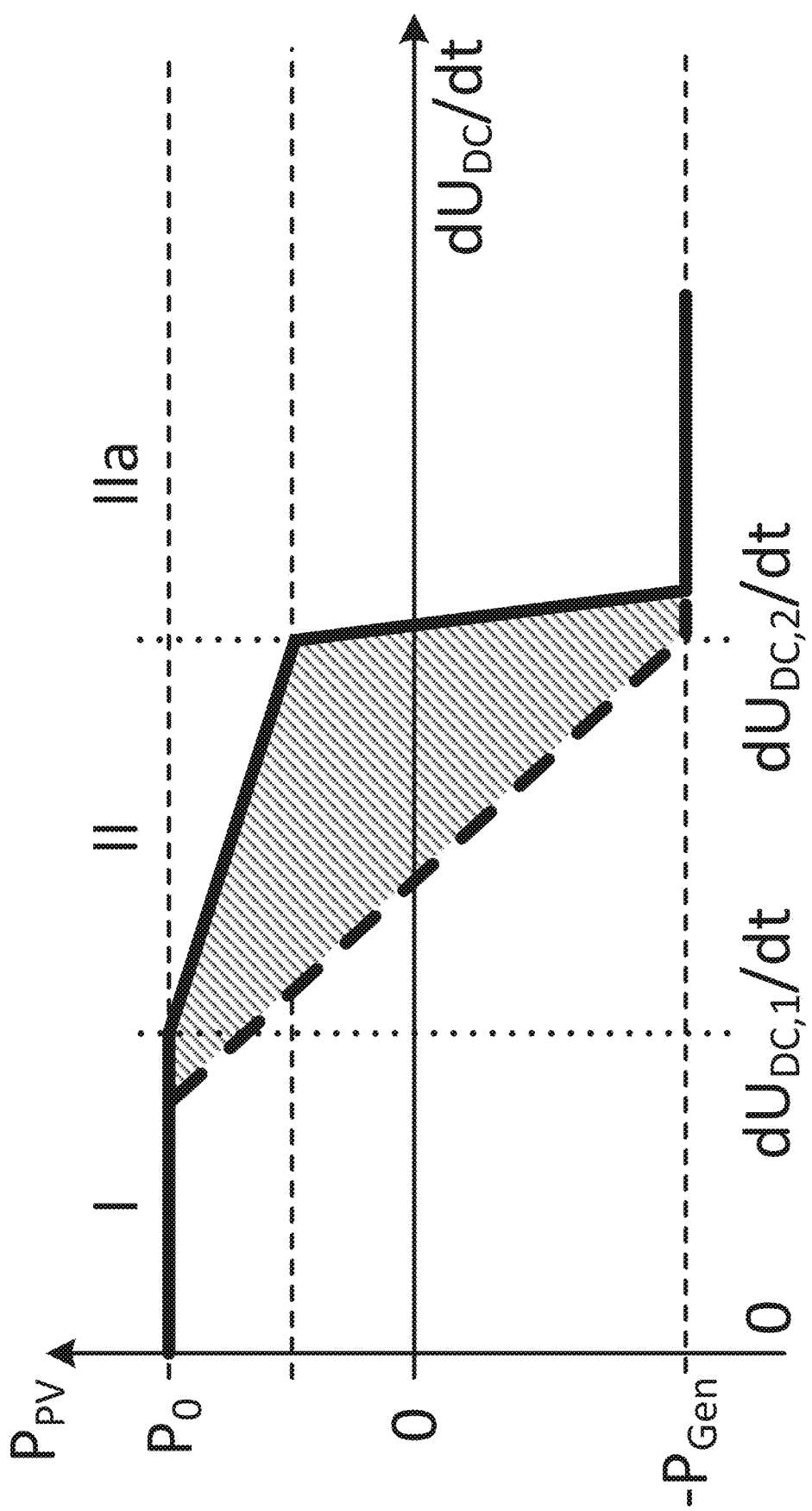
FIG. 4 shows a characteristic curve from a further embodiment of a method for stabilizing a DC voltage in a DC grid.
Figure 5:
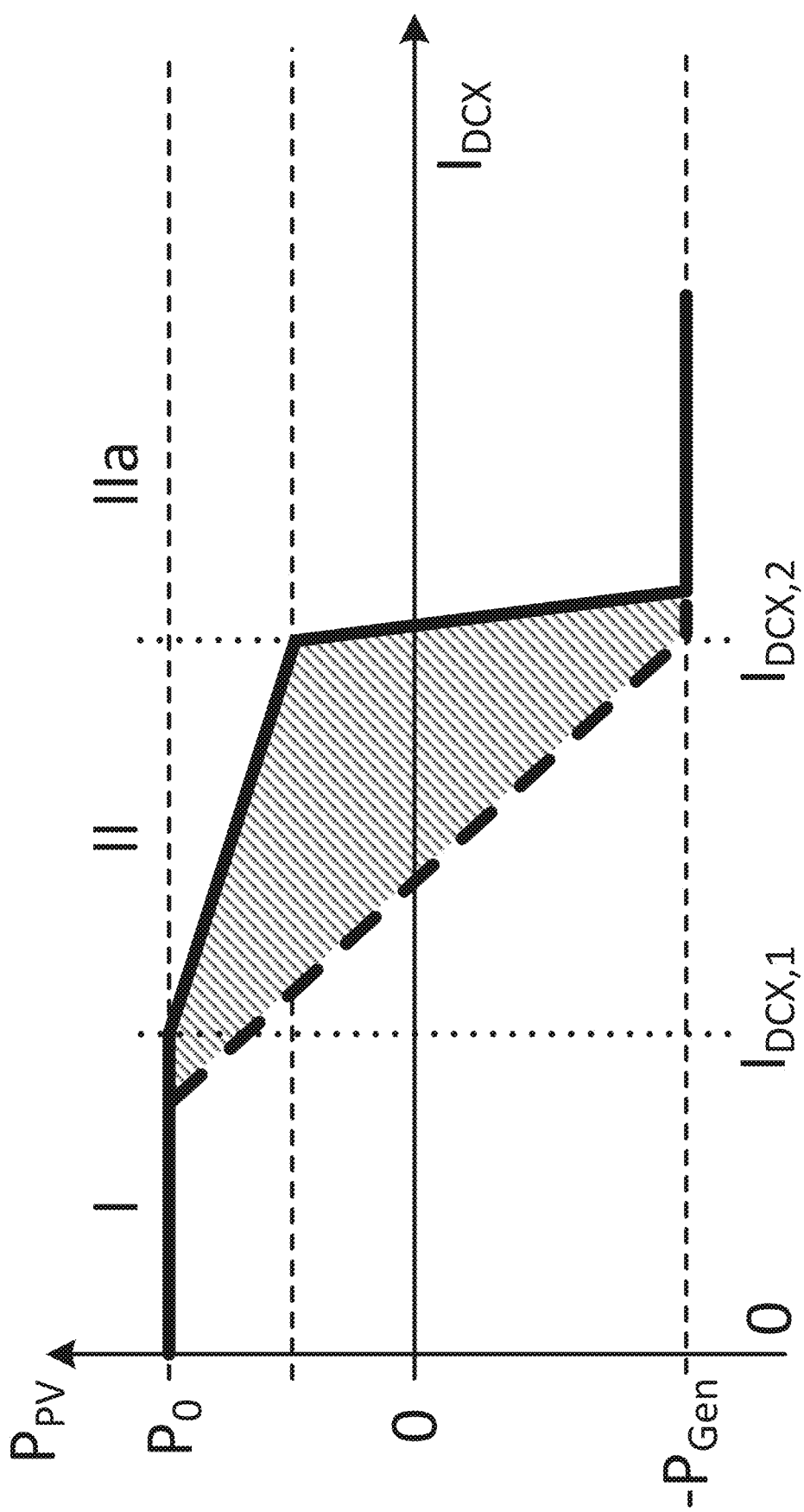
FIG. 5 shows a characteristic curve from a further embodiment of a method for stabilizing a DC voltage in a DC grid.

In a second region II, where $U_{DC1}<U_{DC}<U_{DC2}$, the DC voltage $U_{DC}$ in the DC bus 10 is increased compared to the nominal voltage $U_{Nom}$. In this region II, the PV system 18 switches into grid support operation, and curtailment of the PV power $P_{PV}$ is carried out according to a $P_{PV}(U_{DC})$ characteristic curve. For this purpose, the voltage $U_{PV}$ at the PV generator 18a can be changed in the direction of the no-load voltage of the PV generator 18a. If the DC voltage $U_{DC}$ in the DC bus 10 is higher than the no-load voltage of the PV generator 18a, the voltage $U_{PV}$ at the PV generator 18a approaches the DC voltage $U_{DC}$ in the DC bus 10. The PV power $P_{PV}$ can return to zero with increasing DC voltage $U_{DC}$ and become negative in the further course, i.e., electrical power can be fed back into the PV generator 18a. In this case, the characteristic curve can run along the upper characteristic curve limit 40. Alternatively or additionally, a stronger, i.e., disproportionate, curtailment can take place such that the $P_{VP}(U_{DC})$ characteristic curve has a nonlinear profile in the characteristic curve range 42. This is useful in particular if further measurement values are added and indicate instabilities—for example, if a high rate of change $$\frac{dU_{DC}}{dt}$$

of the DC voltage $U_{DC}$ or a high DC current IDC occurs in the DC bus 10 (cf. FIG. 4 or FIG. 5).

In a region IIa, where $U_{DC2}<U_{DC}<U_{DC3}$, increased curtailment of the PV generator 18a can take place—in particular, by the voltage $P_{PV}$ at the PV generator 18a being further changed in the direction of the no-load voltage of the PV generator 18a and, optionally, further, such that electrical power is fed back into the PV generator 18a. When the maximum possible feedback power $-P_{Gen}$ to the PV generator 18a is reached, the feedback power can be kept constant in the case of a further rise in the DC voltage $U_{DC}$ in the DC bus 10 by means of control, as long as the DC voltage $U_{DC}$ remains below the voltage threshold $U_{DC3}$. In this case too, control is alternatively or additionally possible along a non-linear $P_{PV}(U_{DC})$ characteristic curve, such that the change in the PV power is amplified with increasing DC voltage $U_{DC}$.

In the region III, where $U_{DC} \geq U_{DC3}$, a protective shutdown of the PV system 18 can finally occur, as a result of which the DC-to-DC converter 18a is disconnected from the DC bus 10; in such an extreme situation, the entire DC grid 1 can, optionally, be switched off for safety reasons.

FIG. 4 shows a further embodiment of the method according to the disclosure, in which a DC instantaneous reserve power is provided by the PV system 18; this corresponds, analogously, to a virtual inertia or a virtual increase in the capacitance of the DC bus 10 in that the PV system 18 sets the PV power, exchanged with the DC bus 10, according to FIG. 4.

The DC instantaneous reserve power is provided by the PV system 18 in that the PV power $P_{PV}$ is set as a function of the rate of change of the DC voltage $$\dot{U}_{DC} = \frac{dU_{DC}}{dt}.$$

In this case, the PV power $P_{PV}$, in a normal operating mode, i.e., when the rate of change $$\frac{dU_{DC}}{dt}$$

is below a first limit value $$\frac{dU_{DC,1}}{dt},$$

is set to the normal operating power $P_0$ on the order of magnitude of the MPP power. If the rate of change $$\frac{dU_{DC}}{dt}$$

exceeds the first limit value $$\frac{dU_{DC,1}}{dt},$$

the PV power is reduced with respect to the normal operating power $P_0$. The PV system 18 thus reacts to a rapid change in the DC voltage $U_{DC}$ in the DC bus 10 with a proportional or disproportionate change in the PV power $P_{PV}$. In this embodiment, the PV power or PV current change counteracts the deviation and the rate of change of the DC voltage $U_{DC}$, and, optionally, comprises feedback into the PV generator 18a, i.e., a negative PV power $-P_{PV}$, according to FIG. 4. If the rate of change $$\frac{dU_{DC}}{dt}$$

exceeds the first limit value $$\frac{dU_{DC,2}}{dt},$$

the maximum possible feedback power $-P_{Gen}$ is fed back into the PV generator 18a. By means of the method, the deviation of the DC voltage $U_{DC}$ from its nominal value $U_{Nom}$ is limited, reduced, and, ideally, completely avoided.

The specific dependence of the PV power $P_{PV}$ upon the rate of change of the DC voltage $$\dot{U}_{DC} = \frac{dU_{DC}}{dt}$$

can be predefined by a characteristic curve. The characteristic curve runs in a characteristic curve range that is defined, analogously to FIG. 3, by an upper and a lower characteristic curve limitation and, within this characteristic curve range, optionally has a non-linear shape. In particular, a family of characteristic curves can be specified from which, during operation, a characteristic to be currently used is selected on the basis of further parameters—for example, on the basis of the current DC voltage $U_{DC}$ in the DC bus 10.

FIG. 5 shows a further embodiment of the method according to the disclosure in which a DC instantaneous reserve power is provided by the PV system 18. In contrast to the embodiment according to FIG. 4, the PV power $P_{PV}$ is in this case set as a function of an amplitude of a direct current IDC in the DC bus 10. The direct current IDC can be determined from a measurement of a partial current $I_{DCX}$ in a partial capacitance $C_{DCX}$ of the DC bus 10 with the total capacitance $C_{DC}$.

The DC instantaneous reserve power according to FIG. 5 is provided by the PV system 18 in that the PV power $P_{PV}$ is set as a function of the partial current $I_{DCX}$. The partial current $I_{DCX}$ can be measured at a partial capacitance $C_{DCX}$—for example, at an output capacitance of the PV-based DC-to-DC converter 18b. The partial current $I_{DCX}$ is in this case in the same ratio to the direct current IDC in the DC bus 10 as the partial capacitance $C_{DCX}$ to the total capacitance $C_{DC}$ of the D bus 10. A corresponding scaling factor for determining the total current IDC from the partial current $I_{DCX}$ can be determined when the DC grid 1 is initially put into operation, or can be continuously determined during operation. In contrast to the method according to FIG. 4, only a current measurement is necessary here, and, in particular, a derivative of the DC voltage $U_{DC}$ can be dispensed with.

Specifically, the PV power $P_{PV}$ is set to the normal operating power $P_0$ in a normal operating mode, i.e., when the partial current $I_{DCX}$ is below a first limit value $I_{DCX,1}$. If the partial current $I_{DCX}$ exceeds the first limit value $I_{DCX,1}$, the PV power is reduced with respect to the normal operating power $P_0$. The PV power $P_{PV}$ follows a characteristic curve that, analogously to FIGS. 3 and 4, runs within a characteristic curve range that is defined by an upper and a lower characteristic curve limitation and can run non-linearly within the characteristic curve range.

As a result of the proportional or disproportional change in the PV power $P_{PV}$ as a function of the amplitude of the DC bus current IDC or of the partial current $I_{DCX}$, the PV system 18 counteracts the change and the rate of change of the DC voltage $U_{DC}$ in the DC bus 10. The change in the PV power $P_{PV}$ can comprise power feedback into the PV generator 18a. If the partial current $I_{DCX}$ exceeds a second limit value $I_{DCX,2}$, the maximum possible feedback power $-P_{Gen}$ can be fed back into the PV generator 18a. By means of the method, the deviation of the DC voltage $U_{DC}$ in the DC bus 10 from its nominal value $U_{Nom}$ is limited, reduced, and, ideally, completely avoided.

Figure 6:
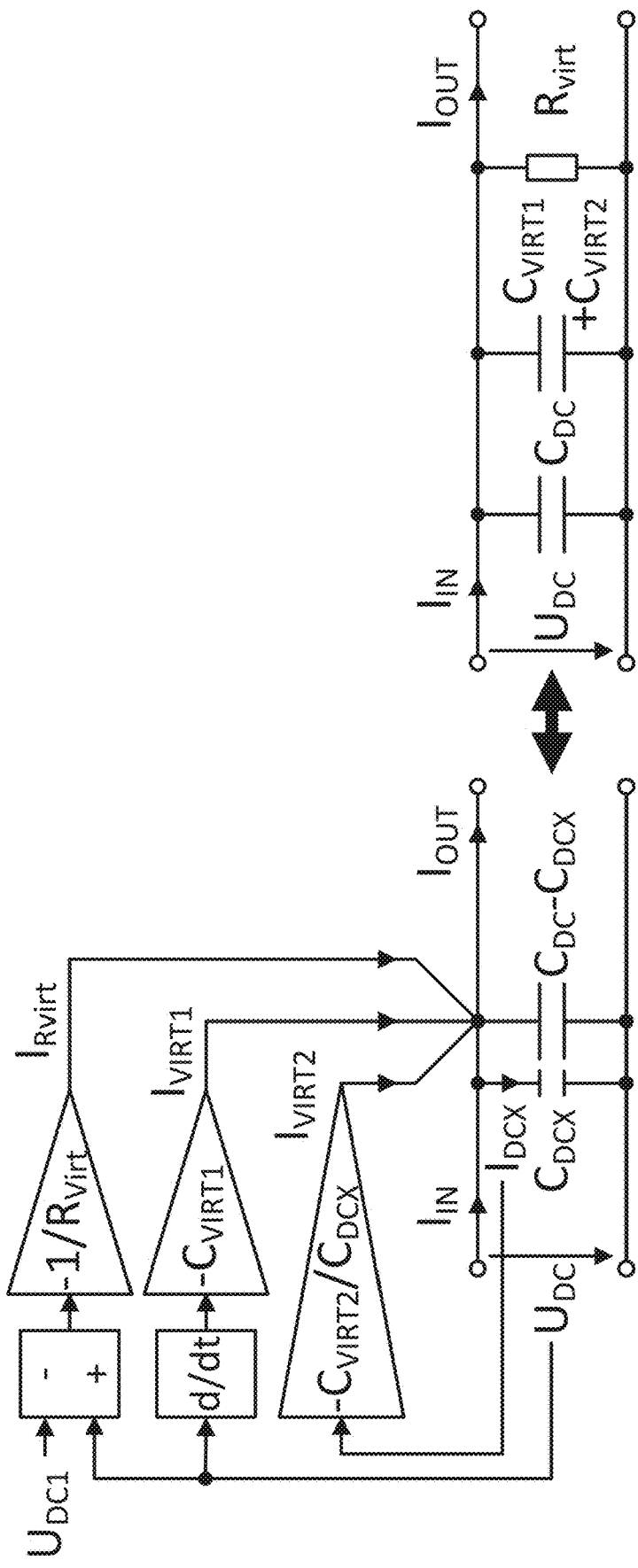
FIG. 6 shows a control from one embodiment of a method for stabilizing a DC voltage in a DC grid.

FIG. 6 shows an embodiment of a specific control 60 and the effect thereof on the DC voltage $U_{DC}$ in the DC bus 10 in the context of the method according to the disclosure. The embodiments explained with reference to FIGS. 3 through 5 can be combined by means of the control 60. The mechanisms of action of this embodiment of the method according to the disclosure and the resulting reaction of the DC voltage $U_{DC}$ to sudden power imbalances in the DC bus 10, i.e., in the case of a sudden, strongly unbalanced power balance $\Delta P = P_{IN} - P_{OUT}$ in this DC bus 10, are explained with reference to FIG. 6 and the following embodiments.

The total capacitance $C_{DC}$ of the DC bus 10 is virtually increased by a differential control component of the control 60 by $C_{VIRT}$ in that the PV system 18 sets the PV power $P_{PV}$ as a function of the rate of change $$\frac{dU_{DC}}{dt}.$$

The differential control component limits the gradient of the DC voltage $U_{DC}$ in the DC bus 10 by providing a DC instantaneous reserve power (cf. FIG. 4 and the associated description, based on the derivation of the DC voltage $U_{DC}$, or FIG. 5 as an embodiment with reserve power based on the determination of the direct current $I_{DC}$). This behavior corresponds to a virtual increase in the total capacitance $C_{DC}$ of the DC bus 10 and, in the case of a power imbalance in the DC bus 10, leads to the DC voltage $U_{DC}$ drifting away more slowly, but not stopping, because the power balance in the DC bus 10 is not compensated for by the higher capacitance alone.

Compensation for the power balance in the DC bus 10 is sought by means of an additional proportional control component of the control 60. The PV system 18—optionally, supported by the energy store 16—adjusts its power as a function of the DC voltage $U_{DC}$ itself or of the deviation of the DC voltage $U_{DC}$ from its nominal value (cf. FIG. 3 and the associated description). The proportional control component has a voltage-maintaining function in that a power imbalance in the DC bus 10 is at least reduced, and drifting away of the DC voltage $U_{DC}$ is slowed down. The smaller a virtual parallel resistor $1/R_{VIRT}$ used as a scaling factor in this proportional control component of the control 60 is designed, the greater the change is in the PV power $P_{PV}$ (represented here by the current $I_{Rvirt}$) due to the proportional control component of the control 60 in the case of a voltage change that is otherwise the same, and the less far the DC voltage $U_{DC}$ drifts away from its nominal value $U_{nom}$, and the faster the drifting away is stopped.

In addition to the PV system 18, further power converters can be connected to the DC bus 10, which power converters can also be configured to return the DC voltage $U_{DC}$ in the DC bus 10 to the nominal value. These further power converters—in particular, a bidirectional inverter (DC-to-AC converter) 11b between the DC bus 10 and the energy supply network 11a or a bidirectional DC-to-DC converter 12b between the DC bus 10 and the supply grid 12a (cf. FIGS. 1 and 2)—can, in the event of a continuous deviation of the DC voltage $U_{DC}$ from its nominal value, likewise suitably change the power exchanged with the DC bus 10 in order to compensate for the power imbalance; this corresponds to an additional integrating control component that can be implemented in the control 60 or as part of higher-order control of the DC grid 1. In this case, this integrating control component contributes to returning the DC voltage $U\_DC$ to the nominal value $U_{Nom}$ and can be implemented with reduced dynamics. The transient overvoltages are already effectively countered by the PV system 18 by means of the proportional and differential control components of the control 60 in that said control components limit the gradient of the DC voltage $U_{DC}$ or contribute to the voltage maintenance.

By adapting the power of the (further) power converters participating in the return of the DC voltage $U_{DC}$ to the nominal value $U_{nom}$, the DC voltage $U_{DC}$ in the DC bus 10 is returned to a voltage band around its nominal value; in return, the change in the PV power $P_{PV}$ within the scope of the proportional or integral control component of the control 60 can be successively reduced such that the PV power $P_{PV}$ is returned to the normal operating power. As a result, in the case of any further (transient) power imbalance—in particular, starting from a DC voltage $U_{DC}$ near the nominal voltage $U_{Nom}$—the full DC instantaneous reserve power of the PV system 18 is available. This also means that the effect of the described solutions is then particularly advantageously developed if either the deviation or the rate of change of the DC voltage $U_{DC}$ or the deviation of the direct current IDC in the DC bus 10 exceeds defined deadband values in each case; the dynamic behavior in the DC bus 10 is not influenced within the respective deadband.

Figure 7:
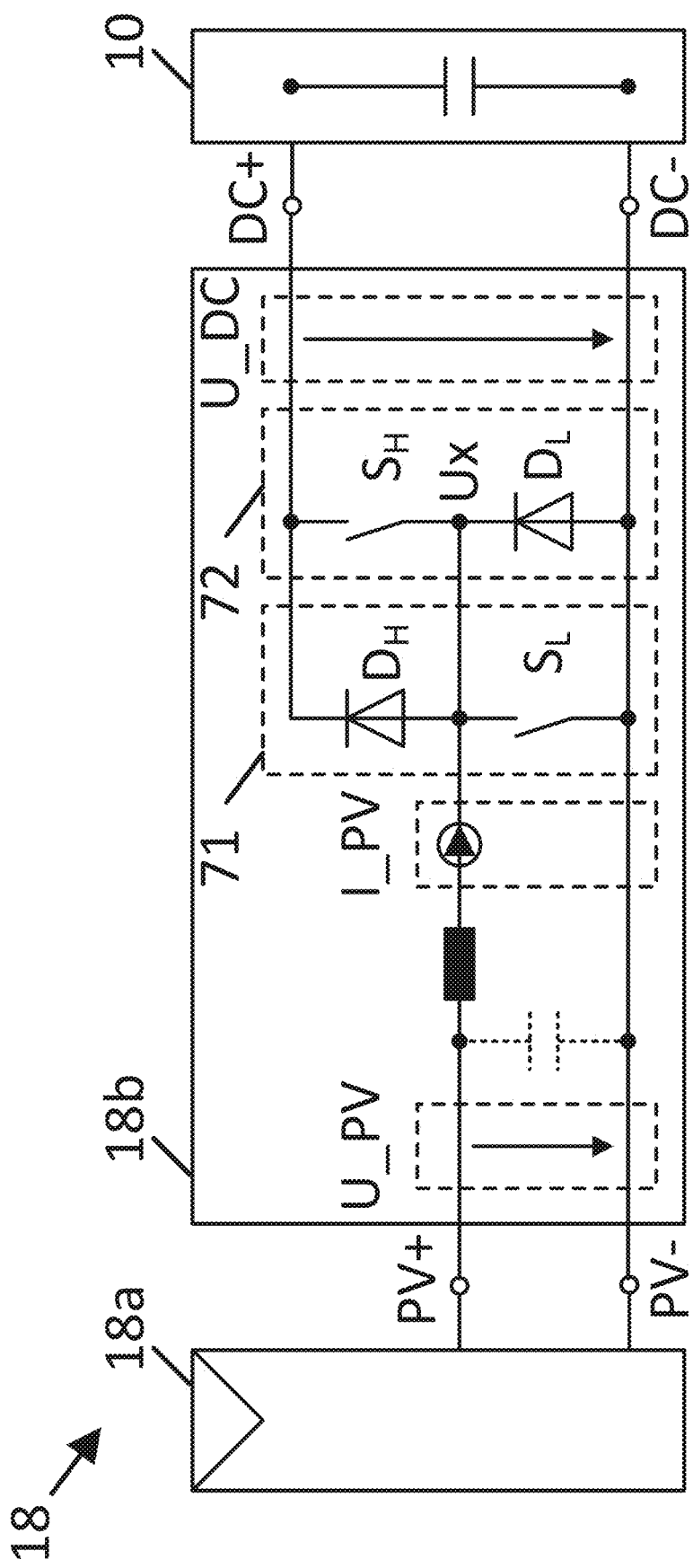
FIG. 7 shows a DC-to-DC converter for electrical connection between a PV generator and a DC grid.

FIG. 7 shows an embodiment of an energy generating system 18 having a bidirectional DC-to-DC converter 18b for connecting the PV generator 18a to the DC bus 10. The DC-to-DC converter 18b can be arranged between the PV generator 18a and the DC bus 10 and can manage the step-up and step-down voltage transmission types in different energy flow directions. Specifically, the DC-to-DC converter 18b can be configured as a two-quadrant converter. For a transfer of electrical power from the PV generator 18a to the DC bus 10, the DC-to-DC converter 18b comprises a step-up converter 71 having a first switch $S_L$ and a first diode DH, and, conversely, for feedback from the DC bus 10 into the PV generator 18a, a step-down converter 72 having a second switch $S_H$ and a second diode $D_L$. The DC-to-DC converter 18b thus has, in particular, a half bridge having the power semiconductors $S_L$, $S_H$, $D_L$, and DH and, by means of suitable clocking of the switches $S_L$ and $S_H$, allows a demand-based power exchange between the PV generator 18a and DC bus 10. If both switches $S_L$, $S_H$ are open and are not clocked, the PV voltage $U_{PV}$ approximates the DC voltage $U_{DC}$ in the DC bus 10. In addition, a feedback of electrical power from the DC bus 10 into the PV generator 18a can be made possible by bridging the first diode DH by means of closing the switch $S_H$.

Depending upon the design of the PV generator 18a, the PV voltage $U_{PV}$, which is oriented to the MPP voltage of the PV generator, to be set in normal operating mode can be less than or equal to the DC voltage $U_{DC}$ in the DC bus 10. Particularly if the maximum PV voltage $U_{PV,max}$ and the maximum DC voltage $U_{DC,max}$ are approximately the same (e.g., $U_{PV,max}=U_{DC,max}=1,000$ V), the PV generator 18a can be designed such that the system voltage is not exceeded, even in PV feedback operation. In this case, the PV voltage is always less than or equal to the maximum DC voltage $U_{DC}$ in the DC bus 10 and can be set by means of a step-up converter. If, on the other hand, the PV generator design is such that the PV voltage $U_{PV}$ can assume higher values than the DC voltage $U_{DC}$ in the DC bus 10, a multi-quadrant converter can be used for the feedback.

Figure 8A:
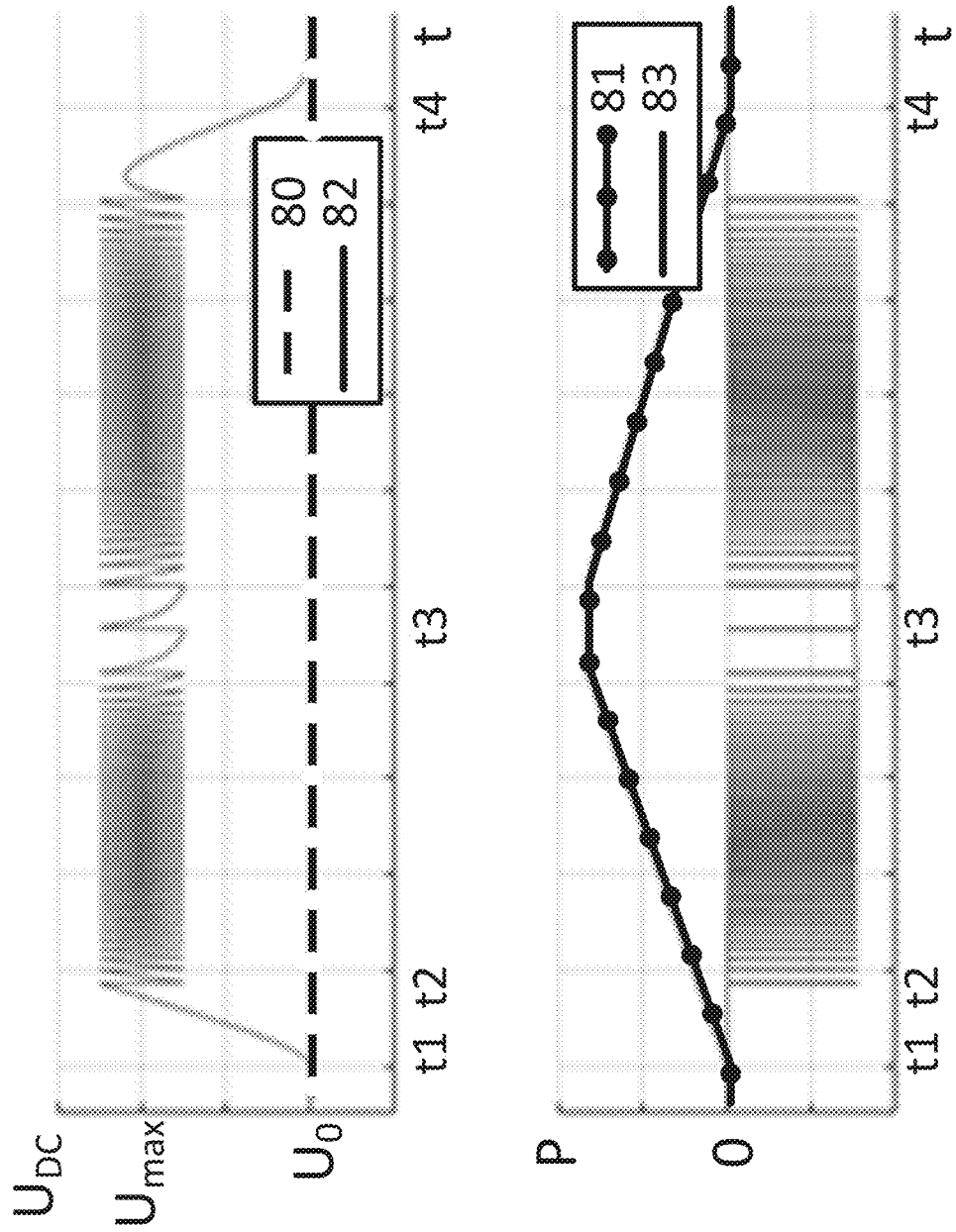
FIG. 8*a* shows time profiles of a DC voltage in a DC grid and of powers of a disruption and of a chopper resistor in the DC grid.
Figure 8B:
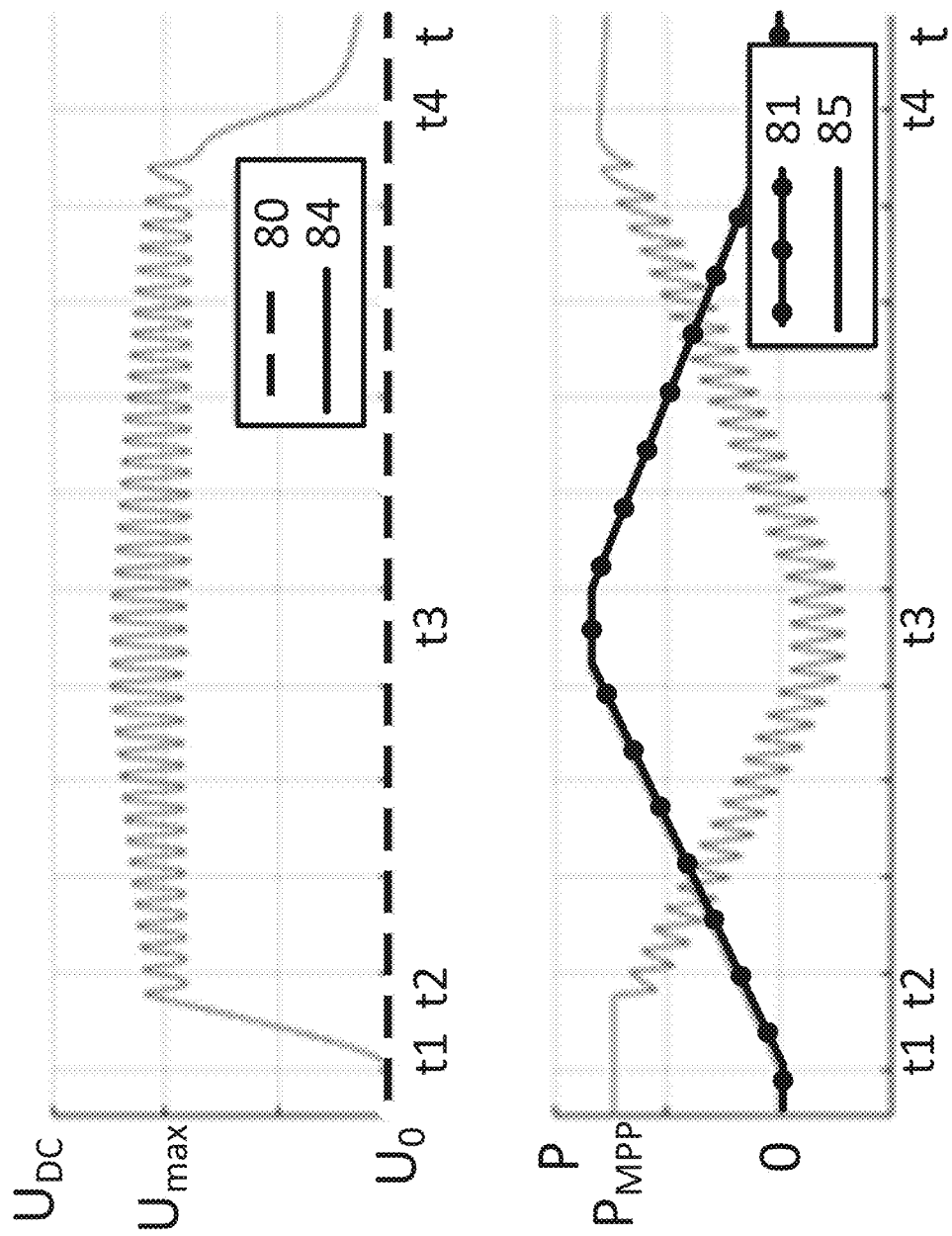
FIG. 8*b* shows time profiles of a DC voltage in a DC grid and of powers of a disruption and of a PV generator in the DC grid.

FIGS. 8a and 8b show, by way of example, time profiles of the DC voltage $U_{DC}$ and the power P in the DC bus 10 of a DC grid 1 for two different cases. In the respectively upper part of FIGS. 8a and 8b, voltage profiles 82, 84 of the DC voltage $U_{DC}$ in the DC bus 10 are shown over the time t, wherein the nominal voltage $U_0$ is represented by the dashed line 80. In the respectively lower part of FIGS. 8a and 8b, power profiles 83, 85 of powers P in the DC bus 10 are shown over the time t, wherein the dotted line 81 represents the power balance in the DC bus 10.

In FIG. 8a, the DC voltage $U_{DC}$ at time t<t1 corresponds to the nominal voltage $U_0$, wherein the sum of the powers fed into the DC bus 10 and the sum of the powers taken from the DC bus 10 are approximately equal; in other words, there is no disruption of the power balance, and the dotted line 81 is at zero.

At the time t1, a linearly increasing disruption of the power balance begins, which is caused, for example, by a consumer 13a having decreasing consumer power, a braking generator 14a, or a WEI 17 having increasing wind energy power, and the dotted line 81 rises. At the same time, the DC voltage $U_{DC}$ in the DC bus 10 also rises and, at the time t2, exceeds a threshold value $U_{max}$ or a value $U_{max}+\Delta U$ deviating from the threshold value $U_{max}$ by a hysteresis $\Delta U$. A load resistor 15a is then activated and draws an electrical reserve power, represented by the power profile 83, from the DC bus 10, as a result of which the DC voltage $U_{DC}$ decreases again. If the DC voltage $U_{DC}$ is again below the threshold value $U_{max}$ or below a value $U_{max}-\Delta U$ deviating from the threshold value $U_{max}$ by a hysteresis $\Delta U$, the load resistor is deactivated, and the DC voltage $U_{DC}$ rises again above the threshold value $U_{max}$, and so forth.

The result is a clocked reserve power having the power profile 83 and the voltage profile 82. In the case of a further rise in the disruption of the power balance, represented by the rise in the dotted line 81 between the times t2 and t3, the duty cycle of the clocked reserve power also increases, i.e., the load resistor 15a is activated increasingly longer for each time unit and, consequently, increasingly heats up. At the time t3, the disruption of the power balance has reached a value that corresponds approximately to the instantaneous reserve power of the load resistor 15a such that the load resistor 15a remains activated for relatively long time periods in order to establish the power balance and to stabilize the DC voltage $U_{DC}$. If the disruption of the power balance continues to rise, the reserve power would no longer be sufficient to stabilize the DC voltage $U_{DC}$ in the DC bus 10 and would further increase the DC voltage $U_{DC}$. Between the times t3 and t4, however, the disruption of the power balance decreases to zero again, e.g., by a consumer 13a increasing its consumer power (again), or by further control reserves, connected to the DC bus 10, but reacting more slowly, drawing excess power from the DC bus 10—in particular, due to an integrating control component and/or at the request of a higher-order control of the DC grid. Accordingly, the duty cycle of the power profile 83 is reduced. At the time t4, the power balance is restored in the DC bus 10, the DC voltage $U_{DC}$ in the DC bus 10 corresponds to the nominal voltage $U_0$, and the load resistor 15a is deactivated.

In FIG. 8b, the DC voltage $U_{DC}$ at a time t<t1 corresponds to the nominal voltage $U_0$, for example, there is no disruption of the power balance, and the dotted line 81 is at zero. At the same time, a PV system 18 feeds an MPP power $P_{MPP}$ of a PV generator 18a into the DC bus 10 via a DC-to-DC converter 18b.

At the time t1, a linearly rising disruption of the power balance begins, i.e., both the dotted line 81 and the DC voltage $U_{DC}$ rise. At the time t2, the DC voltage $U_{DC}$ in the DC bus 10 exceeds the threshold value Umar or a value $U_{max}+\Delta U$ deviating from the threshold value $U_{max}$ by a hysteresis $\Delta U$. The DC-to-DC converter 18b then changes its operating mode such that the PV voltage moves away from the MPP in the direction of the DC voltage $U_{DC}$. In particular, the DC-to-DC converter 18b can interrupt a clocking of its power semiconductors for this purpose such that the DC voltage $U_{DC}$ in the DC bus 10 is applied to the PV generator 18a via possible capacitances and inductances of the DC-to-DC converter 18b. This change in the PV voltage reduces the PV power fed into the DC bus, represented by the power profile 85. This counteracts the excess of power in the DC bus 10 such that the DC voltage U_DC decreases again. If the DC voltage $U_{DC}$ is again below the threshold value U_max or below a value $U_{max}-\Delta U$ deviating from the threshold value $U_{max}$ by a hysteresis $\Delta U$, the DC-to-DC converter 18b is operated again in such a way that the PV voltage is again moved in the MPP direction—in particular, by resuming the clocking of the power semiconductors of the DC-to-DC converter 18b—and the PV power rises. The DC voltage $U_{DC}$ then rises again above the threshold value $U_{max}$ or above $U_{max}+\Delta U$, and so forth.

The result is a modulated PV power having the power profile 85 and the voltage profile 84. In the event of a further rise in the disruption of the power balance, represented by the rise in the dotted line 81 between the times t2 and t3, the average value of the PV power decreases further, while the period of the modulation can largely remain constant. At the time t3, the disruption of the power balance has reached a value that is greater in magnitude than the MPP power of the PV generator 18a, such that the PV power has changed signs, and modulated power feedback into the PV generator 18a takes place. Depending upon the design of the PV voltages in relation to the DC voltage $U_{DC}$ in the DC bus 10, it may be necessary for this purpose to activate the DC-to-DC converter in a different operating mode in order to change the PV voltage across the DC voltage in the DC bus—in particular, to generate a PV voltage above the DC voltage $U_{DC}$ in the DC bus 10.

In principle, the PV generator 18a is able to absorb a feedback power on the order of magnitude of its nominal power. By means of a suitable design and control of the DC-to-DC converter 18b, the PV system 18 can thus provide a reserve power that always comprises at least the nominal power of the PV generator 18a and, in this case, more than twice the current MPP power of the PV generator 18a, this reserve power being available to at least limit a power imbalance due to a correspondingly large disruption and to stabilize the DC voltage $U_{DC}$.

Between the times t3 and t4, the disruption of the power balance decreases to zero again, and the mean value of the PV power increases according to the power profile 85. At the time t4, the power balance is restored in the DC bus 10, the DC voltage $U_{DC}$ in the DC bus 10 corresponds to the nominal voltage $U_0$, and the PV system 18 feeds the MPP power of the PV generator 18a into the DC bus 10.

The comparison of the dynamic aspects when using reserve loads 15 (FIG. 8a) or PV systems 18 (FIG. 8b) for stabilizing the DC voltage $U_{DC}$ in the DC bus 10 shows that a PV generator 18a that is connected via a suitable DC-to-DC converter 18b to the DC bus 10 can be operated similarly to a load resistor 15a, in order to contribute to the sufficiently rapid stabilization of the DC voltage in the DC bus 10. A load resistor 15a has a linear, time-invariant, unchangeable U/I characteristic curve. In contrast thereto, a PV generator has a non-linear, time-variant U/I characteristic curve whose equivalent internal resistance becomes increasingly smaller with increasing voltage. This non-linearity of the PV characteristic curve can advantageously be used to stabilize the DC voltage in the DC bus 10 and, in particular, to avoid overvoltages in the DC bus 10. By deactivating the DC-to-DC converter 18b of the PV system 18, the PV voltage rises above the MPP voltage, wherein the PV current decreases exponentially with increasing PV voltage. The PV power even gets negative at PV voltages above the PV no-load voltage. Due to the high slope of the PV characteristic curve at voltages above the MPP, small changes in the PV voltage already cause relatively large changes in the PV current.

In one embodiment, due to the dependence of the PV characteristic curve upon different external parameters—for example, upon irradiation and temperature—the specifically desired operating point is permanently monitored on the PV characteristic curve and adjusted by means of suitable control of the DC-to-DC converter.

In addition, in cases without irradiation, for example, in the dark, the PV generator 18a can absorb the simple PV nominal power as feedback power, wherein, as a result of lower PV voltages, a somewhat larger current flows compared to the load resistor of the same nominal power. When the PV generator 18a is fully irradiated, i.e., in a normal operation close to the PV nominal power, almost twice the PV nominal power is available as reserve power, in that the PV power is regulated from the MPP power to zero. Furthermore, a power on the order of magnitude of the PV nominal power may be fed back into the PV generator 18a. Thus, a PV system 18 provides at least as much reserve power as a reserve load 15 having a comparable rated power, wherein the available reserve power of the PV system 18, with increasing irradiation, increases to twice the PV nominal power.

When the DC voltage $U_{DC}$ is applied to the load resistor 15a or when the voltage is changed at the PV generator 18a, a respective corresponding operating point is generally established without delay, provided that parasitic effects are negligible. However, because the PV generator 18a is operated via a power-electronic DC-to-DC converter 18b that, for example, can comprise smoothing filters having inductive and/or capacitive filter energy stores, a shift of the operating point of the PV generator 18a does not take place at any speed, but with a time delay that depends upon the size of the filter energy store and the maximum permissible electrical quantities. This delay can be minimized by using advanced power semiconductors and/or by increasing the switching frequency and/or by reducing the filter energy store, if necessary. In one embodiment, the rate of change of current achievable at the filter energy store is greater than the rate of change of voltage in the DC bus 10. In addition, in one embodiment, suitable precautions are taken to prevent excessively high compensating currents, overvoltages, and/or excessive electrical powers in order to avoid damaging of components of the DC-to-DC converter 18b when the DC voltage $U_{DC}$ in the DC bus 10 is applied to the PV generator 18a. For this purpose, the determination and monitoring of the currents flowing and voltages occurring in the DC-to-DC converter 18b, which takes place anyway as part of the usual control of the DC-to-DC converter 18b, can be used. Alternatively or additionally, the power semiconductors of the DC-to-DC converter 18b responsible for the voltage adjustment can be bridged, for example, with an additional connected line.

What is claimed is:

1. A method for stabilizing a DC voltage in a DC grid,
wherein the DC grid comprises a DC bus that has the DC voltage,
wherein an energy generating system and at least one load are connected to the DC bus,
wherein the DC bus is connected to a higher-order grid,
wherein an electrical grid power is exchanged between the DC bus and the higher-order grid, wherein the electrical grid power is varied in order to maintain the DC voltage in the DC bus at a nominal voltage,
wherein the energy generating system comprises a PV generator that is connected to the DC bus via a DC-to-DC converter and exchanges electrical generator power with the DC bus,
in a normal operating mode, setting the electrical generator power to a normal operating power by the DC-to-DC converter as a function of an MPP power of the PV generator, and setting the normal operating power variably in a predetermined relation to the MPP power of the PV generator or fixedly at a value below the MPP power of the PV generator,
monitoring the DC voltage in the DC bus using the energy generating system,
in a grid support mode, setting the electrical generator power as a function of the DC voltage in the DC bus to a grid support power in order to counteract a power imbalance between a total electrical power supplied to the DC bus and a total power withdrawn from the DC bus, and
setting the grid support power as a function of a deviation of the DC voltage from its nominal value and/or a rate of change of the DC voltage,
wherein the grid support power is less than the normal operating power by a PV control power, and wherein the grid support power has an inverted sign with respect to the normal operating power when the deviation of the DC voltage in the DC bus from the nominal voltage and/or the rate of change of the DC voltage in the DC bus requires the PV control power greater than the MPP power.

2. The method according to claim 1, wherein setting the electrical generator power in the grid support mode occurs when the DC voltage in the DC bus exceeds a predetermined limit value.

3. The method according to claim 1, wherein the electrical generator power is set by clocking power semiconductors of the DC-to-DC converter, wherein a PV voltage applied to the PV generator is set to a normal operating voltage in the normal operating mode by means of a first clock rate, and wherein the electrical generator power in the grid support mode is reduced by the DC-to-DC converter being operated by a second clock rate such that the PV voltage changes in a direction of the DC voltage.

4. The method according to claim 3, wherein the grid support mode is entered and the DC-to-DC converter is operated at the second clock rate when the DC voltage exceeds a limit value or a value deviating upwards from the limit value by a hysteresis, and wherein the normal operating mode is entered and the DC-to-DC converter is operated at the first clock rate when the DC voltage falls below the limit value or a value deviating downwards from the limit value by a hysteresis.

5. The method according to claim 3, wherein the second clock rate has the value zero or one such that the DC-to-DC converter is not clocked in the grid support mode.

6. The method according to claim 3, wherein the DC-to-DC converter is operated in the grid support mode such that the PV voltage is increased further with respect to the DC voltage when the PV voltage is matched to the DC voltage and/or the DC voltage continues to exceed a limit value.

7. The method according to claim 1, wherein the rate of change of the DC voltage is determined from a derivative of a voltage measurement or from a current measurement.

8. The method according to claim 1, wherein an energy store is connected to the DC bus, wherein the energy store is configured to exchange a storage power with the DC bus, wherein, in the normal operating mode, the storage power is equal to zero or comprises a charging of the energy store, wherein, in the grid support mode, the storage power comprises discharging of the energy store in order to counteract a reduction in the DC voltage in the DC bus with respect to its nominal value.

9. The method according to claim 8, wherein, in grid support operation, increasing the storage power in order to counteract a power deficit in the DC bus, and reducing a PV power in order to counteract an excess of power in the DC bus.

10. The method according to claim 8, wherein a state of charge of the energy store in the normal operating mode is between 90% and 100% of a charging capacity of the energy store.

11. The method according to claim 1, wherein the DC bus is connected via a bidirectional power converter to the higher-order grid, wherein the bidirectional power converter comprises a DC-to-DC converter when the higher-order grid comprises a further DC grid, or comprises an inverter when the higher-order gird comprises an AC grid, and setting the electrical grid power exchanged via the bidirectional power converter between the DC bus and the higher-order grid as a function of electrical properties of the higher-order grid in order to stabilize the higher-order grid.

12. The method according to claim 11, wherein the DC bus is connected via the DC-to-DC converter to a supply grid and via the inverter to an energy supply grid and is configured to exchange an electrical DC grid power with the further DC grid and an AC grid power with the AC grid.

13. The method according to claim 11, wherein, in the normal operating mode, a grid power flows from the DC bus into the AC grid and/or the further DC grid, wherein the grid power in the normal operating mode comprises an excess power that corresponds to a difference between a generator power generated by the energy generating system and a power consumed by a consumer and/or a machine.

14. A DC-to-DC converter configured to connect a PV generator to a DC bus of a DC grid, wherein the DC-to-DC converter is configured to exchange electrical power between the PV generator and the DC bus, wherein the DC-to-DC converter further comprises a controller, wherein the controller is configured to:
  in a normal operating mode, set the electrical power to a normal operating power by the DC-to-DC converter as a function of an MPP power of the PV generator, and set the normal operating power variably in a predetermined relation to the MPP power of the PV generator or fixedly at a value below the MPP power of the PV generator,
  monitor a DC voltage in the DC bus using an energy generating system,
  in a grid support mode, set the electrical power as a function of the DC voltage in the DC bus to a grid support power in order to counteract a power imbalance between a total electrical power supplied to the DC bus and a total power withdrawn from the DC bus, and
  set the grid support power as a function of a deviation of the DC voltage from its nominal value and/or a rate of change of the DC voltage,
  wherein the grid support power is less than the normal operating power by a PV control power, and wherein the grid support power has an inverted sign with respect to the normal operating power when the deviation of the DC voltage in the DC bus from its nominal value and/or the rate of change of the DC voltage in the DC bus requires a PV control power greater than the MPP power.

15. A DC-to-DC converter configured to connect a PV generator to a DC bus of a DC grid, wherein the DC-to-DC converter is configured to exchange electrical power between the PV generator and the DC bus, wherein the DC-to-DC converter further comprises a controller, wherein the controller is configured to:
  in a normal operating mode, set the electrical power to a normal operating power as a function of an MPP power of the PV generator,
  monitor a DC voltage in the DC bus using an energy generating system,
  in a grid support mode, set the electrical power as a function of the DC voltage in the DC bus to a grid support power, and
  set the grid support power as a function of a deviation of the DC voltage from its nominal value and/or a rate of change of the DC voltage,
  wherein the grid support power is less than the normal operating power by a PV control power, and wherein the electrical power is fed back into the PV generator when the deviation of the DC voltage in the DC bus from its nominal value and/or the rate of change of the DC voltage in the DC bus requires a PV control power greater than the MPP power.

* * * * *